United States Patent [19]

Rosenfeld et al.

[11] Patent Number: 5,259,957
[45] Date of Patent: Nov. 9, 1993

[54] POROUS MEMBRANES SUITABLE FOR SEPARATION DEVICES AND OTHER USES

[75] Inventors: Aron M. Rosenfeld; Mark A. Jozefowicz, both of Kingston, Canada; Robin C. Furneaux, Sherington, England; Michael P. Thomas, Kingston, Canada

[73] Assignee: Alcan International Limited, Montreal, Canada

[21] Appl. No.: 776,316

[22] PCT Filed: Sep. 28, 1990

[86] PCT No.: PCT/CA90/00329
§ 371 Date: Dec. 16, 1991
§ 102(e) Date: Dec. 16, 1991

[87] PCT Pub. No.: WO91/04785
PCT Pub. Date: Apr. 18, 1991

[30] Foreign Application Priority Data

Sep. 29, 1989 [GB] United Kingdom ............. 8922069.3

[51] Int. Cl.⁵ .............................................. B01D 71/02
[52] U.S. Cl. ................................ 210/490; 210/500.25; 210/500.26; 427/245
[58] Field of Search ................. 205/50, 175; 502/439; 204/296; 210/560.25, 321.84, 321.86, 321.75, 321.82, 500.26, 490; 427/285, 246; 264/49, 41

[56] References Cited

U.S. PATENT DOCUMENTS 4,501,663 2/1985 Merrill .................... 210/321.84 X
4,687,551 8/1987 Furheaux et al. ................. 205/50
5,112,449 5/1992 Jozefowicz et al. ............. 205/175

Primary Examiner—Frank Spear
Attorney, Agent, or Firm—Cooper & Dunham

[57] ABSTRACT

Porous membranes incorporating porous anodic films are disclosed. The membranes, which may be used as filters, gaseous diffusion media, dialysis membranes, etc., are produced by porous anodizing aluminum or other porous anodizable metal, creating a weakened stratum in the resulting porous anodic film (e.g. by a voltage reduction procedure during the anodizing step), attaching a support to the porous anodic film and separating the film along the weakened stratum. If the support is perforated the resulting structure is suitable as a separation device. If imperforate, the support can subsequently be perforated, if required, or replaced by a perforate support or supporting structure. The resulting structure has a non-metallic imperforate or perforated supporting layer (made, for example of plastic or ceramic) or other supporting structure, reinforcing a porous anodic film in which the pores completely penetrate the film.

23 Claims, 1 Drawing Sheet

POROUS MEMBRANES SUITABLE FOR SEPARATION DEVICES AND OTHER USES

TECHNICAL FIELD

This invention relates to porous membranes suitable for separation devices, e.g. those used to separate constituent elements of a mixture of materials of different particle or molecule size, and for other uses.

BACKGROUND ART

There are many ways of producing perforate solid materials useful for separation devices and the like, but such procedures generally cannot produce very thin perforate membranes having very narrow pores which are desired in many filtering and similar applications in order, for example, to reduce back pressures, to increase concentration gradients, and to enable smaller particles to be separated.

It is known that porous oxide films can be grown on certain metals, most notably aluminum and anodizable aluminum alloys, by anodizing such metals in electrolytes containing strong acids, such as sulfuric acid and phosphoric acid and films of this type have been suggested for use in filter devices (see U.S. Pat. No. 3,850,762 issued on Nov. 26, 1974 to A. W. Smith). Anodic films can be made very thin (e.g. in the order of nanometers) and can be grown to any desired larger thicknesses by continuing the anodization process for a suitable length of time. However, it has not generally been convenient to use such films for separation devices and other similar purposes for two basic reasons. First of all, anodic films adhere tenaciously to the underlying metal on which they are formed and cannot easily be removed without resorting to dissolving away the metal substrate (a slow and expensive procedure). Secondly, anodic films produced by porous anodization have imperforate barrier layers at the bases of the pores, immediately adjacent to the metal substrate, so this layer has to be removed if the film is to be used in a device which requires complete penetration of the film, but its removal is very difficult without damaging the remaining porous structure.

We have previously found (see, for example, our European Patent Application Serial No. 0 178 831 published on Apr. 23, 1986, the disclosure of which is incorporated herein by reference) that the adhesion of an anodic film to an underlying metal substrate can be considerably reduced by a pore branching procedure carried out during the porous anodization step, and that the anodic film (which detaches spontaneously or after a period of soaking) thus produced has pores which extend completely from one surface of the film to the other. It is suggested in the published application that the porous anodic films are self-supporting when thick enough (e.g. 50 microns or thicker) but that thin films (0.1 microns to 50 microns) may need to be supported on a porous substrate. It is not easy, however, to attach such free standing films to a suitable support nor to detach such films from the underlying metal in a reliable way when large areas are involved. Films of less than about 25 microns in thickness are particularly difficult to handle in a manufacturing environment. Consequently, porous anodic films have not found widespread use as porous membranes for filters and other devices.

DISCLOSURE OF THE INVENTION

An object of the present invention is to provide a process for producing a very thin porous membrane suitable for separation devices and other purposes.

Another object of the invention is to provide separation devices incorporating very thin porous membranes having very narrow pores.

SUMMARY OF THE INVENTION

According to one aspect of the invention, there is provided a process for producing a porous membrane characterized by porous anodizing a suitable metal substrate to form a porous anodic film on said metal, said film having an outer surface, creating a weakened stratum in said porous anodic film without causing said film to separate at said weakened stratum, attaching a support to said outer surface of said porous anodic film, and separating at least an outer part of said film from said metal substrate to form a porous membrane supported on said support.

If necessary, the porous membrane attached to the support can be transferred to a different support, e.g. a perforated support, suitable as part of a separation device or other device.

According to another aspect of the invention there is provided a process for producing a separation device, which comprises porous anodizing a suitable metal substrate to form a porous anodic film on said metal, said film having an outer surface, creating a weakened stratum in said porous anodic film without causing said film to separate at said weakened stratum, attaching a support to said outer surface of said porous anodic film, separating at least an outer part of said film attached to said support from said metal substrate at said weakened stratum and, if said support is insufficiently perforated for the laminate of the support and the outer film part to act as a suitable separation device, carrying out a further step selected from the group consisting of perforating said support and replacing said support with a perforated supporting structure.

The invention also relates to supported porous membranes and separation devices.

By the term "perforated" support or supporting structure, we mean to include a continuous layer or body having penetrating holes, a mesh or web made up of fibres or filaments having gaps between the fibres or filaments, or any kind of reinforcements which leave clear access to at least some of the pores of the membrane.

The present invention enables the thin porous membrane to be supported during detachment of the anodic film from the metal substrate on which it is formed and during subsequent handling. This means that the membrane can be made very thin (less than 50 microns, for example, and even less than 0.5 microns) and that membranes of large area (e.g. greater than 50 square centimeters) can be formed and incorporated into final products.

Furthermore, because the membrane is supported and can therefore be made thinner than would otherwise be the case, the anodizing process time can be considerably reduced (e.g. by a factor of 20-30 if supported membranes only a few microns in thickness are adequate and 100 or more if membranes of submicronic thickness are desired). Not only does this save energy and result in thinner membranes which are more flexible and have lower flow resistance, but it also means that closer control of pore size may be more readily accomplished. If processing times are long, considerable dissolution occurs along the length of the pore due to the dwell time in the acidic electrolyte and asymmetric pores may be produced. In the present invention, the pores may be made more symmetrical throughout the thickness of the membrane.

The fact that the porous membrane is securely supported also has the advantage that any resulting separation device can be cut by mechanical means or by laser into suitable shapes with reduced risk of splitting or cracking as can be the case with unsupported films.

MODES FOR CARRYING OUT THE INVENTION

The invention is described in more detail by first explaining a preferred embodiment with reference to the accompanying drawings and then discussing variations and alternatives to the steps and structures disclosed.

Figure 1:
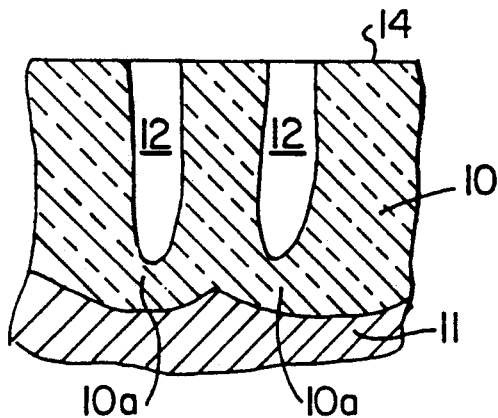
FIG. 1 is a cross-section of a porous anodic film produced by a conventional porous anodization technique.

FIG. 1 is a cross-section through a porous anodic film produced in the conventional manner. The film 10 is grown on a substrate 11, which is generally made of aluminum or an anodizable aluminum alloy, by anodizing the substrate at a voltage of 1-1000 volts, more usually 3-200 volts and more preferably 5-80 volts, in an electrolyte containing an acid such as phosphoric acid, sulfuric acid or oxalic acid. The film contains pores 12 which extend inwardly from the outer surface 14 of the film towards the metal substrate 11. However, the pores are separated from the metal by an imperforate barrier layer 10a which adheres tenaciously at the metal/oxide interface.

Figure 2:
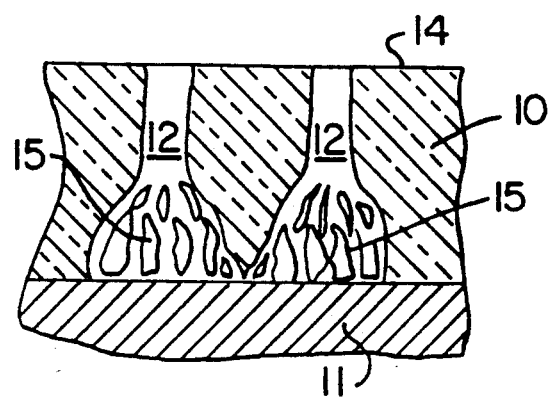
FIG. 2 is a cross-section of a porous anodic film having a weakened stratum at the oxide/metal interface.

FIG. 2 shows a similar cross-section of a porous anodic film 10 formed by a similar porous anodization technique. However, in this case, the final stage of the anodization is modified to produce a region of branched pores 15 at the base of each pore 12 by a voltage-reduction procedure as disclosed in our published European patent application referred to above. Basically this involves varying the voltage in a continuous or stepwise manner. For example, the anodization voltage may be reduced from the original anodization voltage about 25 V to 0 V in 0.5 V increments. The voltage reduction has the effect of causing single pores to branch into numerous small pores that weaken the film.

Collectively, the branched pore regions 15 introduce a weakened stratum into the anodic film 10 adjacent to the metal/oxide interface and the film can be separated fairly easily along this stratum. As noted above, it has been found that the barrier layer 10a of FIG. 1 is extremely thin at the end of the pore branching step and is either destroyed or left behind when the film is separated along the weakened stratum, so that the pores 12 in the detached part of the film (the porous membrane) are open at both opposed surfaces of the detached film and completely penetrate the film.

In any event, the pore branching step should be kept reasonably short in terms of time to prevent premature separation of the film.

If desired, further porous anodization can be carried out after the pore branching step. This prolongs the pores beneath the weakened zone without causing the upper film part to spall off and without compromising the release capability. The weakened stratum can thus be removed from the metal/oxide interface which may give a cleaner separation (fewer defects) if there are localized effects caused by the substrate.

Figure 3:
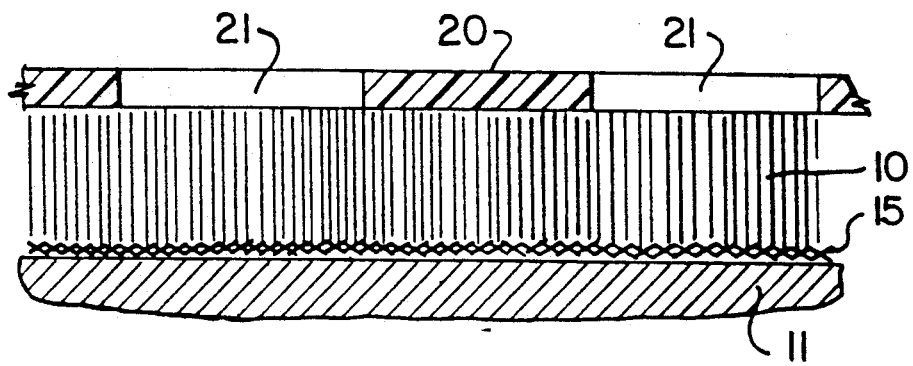
FIG. 3 is a cross-section of a film similar to that of FIG. 2 having an attached perforated support.

Prior to detaching the porous membrane from the metal substrate, a supporting layer 20 (which in this embodiment is itself perforate but need not be) is attached to the outer surface of the film 10 as shown in FIG. 3. The layer 20 preferably has perforations 21 which are quite large compared to the width of the pores 12 in the anodic membrane and can be made, for example, by punching holes in an originally impermeable layer. The layer 20 in this embodiment is a plastic film adhered or heat sealed to the anodic film.

The ratio of the size of the perforations to the thickness of the detached film can be important in some cases when the resulting device is to be used as a separation device. The detached film is essentially unsupported in the areas that lie within the perforations 21. Thinner anodic films require more support than thicker films because of their resulting fragility and so it may be necessary to reduce the width of the perforations 21 as the thickness of the membrane 10 decreases. As a rule of thumb, the diameter of the perforations should be less than the membrane thickness for very thin films. Normally, the perforations range in size from 0.1 micron for very thin membranes (e.g. 0.1 micron) to 500 microns for thicker membranes.

If the layer 20 is flexible, it can be used to assist the detachment of the anodic film from the metal substrate. For example, a part of the layer may extend beyond the anodic film 10 at an edge in order to form a graspable tab and the tab may be used to peel the layer and attached upper anodic film part (porous membrane) from the underlying structure. When the membrane 10 is quite thin (e.g. less than 30 microns and preferably less than 5 microns), it is quite flexible and the bending of the membrane caused when the layer 20 is peeled from the metal substrate does not usually result in damage to the membrane. However, such bending of the membrane can be avoided entirely, if desired, if the substrate metal 11 is itself made thin and flexible and the layer 20 is made less flexible than the substrate 11. The substrate 11 can then be peeled away from the supporting layer 20 and the adhering membrane 10 without bending the membrane.

Having described one embodiment of the invention above, certain variations and alternatives will be discussed in the following.

First of all, it should be appreciated that a stratum of weakness can be introduced into the anodic film by means other than the voltage reducing step mentioned above. A similar effect can be obtained by a voltage increase, a change of current wave form (e.g. from a.c. to d.c.), or a change of anodizing acid, individually or in combination.

Secondly, there can be considerable variation associated with the support 20. Not only can the nature of the support be varied widely, but the support may also be subsequently removed and replaced by another support or supporting structure. If the membrane is to be used to form a separation device, the final support should itself be perforate. However, if the original support is to be replaced, it need not be perforated because it can be replaced by a perforated member, but even if the support is to remain, it need not be perforated initially since it can be perforated after the detachment of the membrane from the substrate, e.g. by the use of a laser to burn holes in the support or by dissolution or degradation (e.g. by exposing the film to degrading UV radiation from a flash lamp or the like through the anodic film which acts as a mask except in the area of the pores, or by using the anodic film as a resist for a dissolution process).

Replacement of the support can be carried out by sandwiching the laminate of the porous membrane and the support between a pair of fine mesh grids (made for example of TEFLON or stainless steel) and dissolving or burning away the original substrate in situ. The mesh grids can then form the supporting structure for subsequent handling even though they may not be bonded to the anodic film.

After removal of the original support, or even before the original support is applied, selected pores in the membrane may be filled with a material (e.g. a settable liquid such as a lacquer or a polymer solution) that itself reinforces the film. If a suitable pattern of application is selected, such as a dot or grid pattern, good support may be provided while maximizing the areas of unfilled pores. The material penetrating the pores in this way can act alone as a supporting structure after the original support has been removed or it can provide additional support in combination with a porous layer or other support structure.

When the support is a porous layer of the type shown in FIG. 3, it may be organic, such as the polymeric film already mentioned, or inorganic, such as a ceramic. For example, the porous membrane may be incorporated into a porous composite structure of the type disclosed in our co-pending British patent application serial number 8912425.9 filed on May 31, 1989, the disclosure of which is incorporated herein by reference. In such a composite, the porous membrane is integrally bonded to an overlying layer of partly sintered inorganic particles by one of two methods. In the first method, a slurry of inorganic particles is "tape cast" onto the membrane surface and then heated to partly sinter the particles together. In the second method, a slurry of inorganic particles is tape cast onto the surface, a preformed layer of sintered particles is then applied on top and finally the coatings are heated. In each case the average pore size of the ceramic layer is larger than the average minimum pore size of the porous membrane.

When a polymer layer is used as the support, it may be adhered or heat sealed to the anodic film, as briefly mentioned above. Hot melt interfacing materials can be applied in preprogrammed patterns or designs. This provides a meltable layer between the anodic membrane and the support. Alternatively, iron-on interfacing, normally used for stiffening fabrics, can be used to attach a supporting layer, such as a porous nylon mesh, to the anodic film. If the support is to be adhered to the anodic film, this may be done by the spot application of adhesive or polymer solution, e.g. using ink jet printing techniques, to prevent complete blocking of the pores. Yet another attachment technique involves so-called heat staking a porous polymeric membrane of polypropylene, if necessary facilitated by the use of a laser.

The above description has been concerned mainly with the attachment of the porous anodic membrane to a porous support in order to form a separation device. However, the membrane may be attached to an imperforate support in order to form other types of devices, such as catalyst supports and the like. Whether porous or non-porous, the layers used to support the porous membrane are preferably polymeric and are advantageously heat sealed to the membrane.

Figure 4:
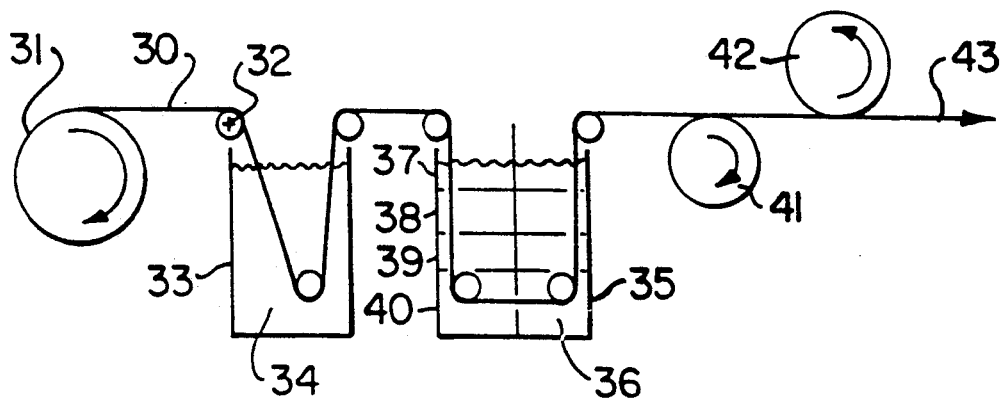
FIG. 4 is a cross-section of an apparatus used for the process.

Returning to the anodizing step of the invention, not only does the use of low anodization voltages produce anodic films having fine pores, which are desirable in most cases, but it also results in low heat evolution and this means that the substrate can be a thin gauge foil, rather than a thick layer or plate, without the risk of "burning" during anodizing. Because of their thinness and flexibility, foil substrates make it possible to operate the process on a continuous or semi-continuous basis. An example of the process and suitable apparatus therefor is shown in FIG. 4. Aluminum foil 30 is withdrawn from a roll 31 and passed over a roller 32 which acts as a positive electrode. The foil then passes through a bath 33 holding an acidic electrolyte ($H_3PO_4$). The walls of the bath form the cathode and porous anodization of the film takes place.

Upon emerging from the bath 33, the foil is then passed through a further bath 35 also containing an acidic electrolyte 36 for the introduction of the weakened stratum. The bath has electrically separate vertically disposed side wall sections which act as cathodes 37, 38, 39, 40 each of which exerts a reduced potential.

The resulting anodized foil bearing an anodic film containing a weakened stratum is fed past a roll 41 which applies a porous polymer support. The laminate of the foil, film and support then passes roll 42 which detaches the foil and re-rolls it for further use. The remaining support and film combination 43 is then fed to suitable rolling or cutting equipment (not shown).

If higher voltages are required, making the use of foil difficult, the process can still be made continuous by using a metal substrate in the form of a metal drum slowly rotating in an electrolysis bath with the support being continuously applied and detached as in the case of the foil embodiment.

Various other modifications and variations will occur to persons skilled in the art after reading the disclosure above. All such modifications and variations form part of this invention to the extent that they fall within the scope of the following claims.

We claim:

1. A process for producing a supported porous membrane by porous anodizing a suitable metal substrate to form a porous anodic film on said metal, said film having an outer surface, creating a weakened stratum in said porous anodic film, detaching said porous anodic film from said substrate and supporting said porous film on a support to form a porous membrane supported on said support, characterized in that said support is attached to said outer surface of said anodic film prior to detachment of said anodic film from said substrate.

2. A process according to claim 1 characterized in that said weakened stratum is formed in said porous anodic film at a distance from said substrate so that an inner part of said film remains attached to said substrate after detachment of an outer part of said film.

3. A process according to claim 1 characterized in that said weakened stratum is created in said film by reducing an anodizing voltage used for said anodizing step.

4. A process according to claim 1 characterized in that said weakened stratum is created in said film by increasing an anodizing voltage used for said anodizing step.

5. A process according to claim 1 characterized in that said anodizing step is carried out with a current having a particular waveform and said weakened stratum is created by changing said waveform.

6. A process according to claim 1 characterized in that said anodizing step is carried out in an electrolyte containing a particular acid and said weakened stratum is created by replacing said acid with a different acid.

7. A process according to claim 1, claim 2, claim 3, claim 4, claim 5 or claim 6 characterized in that said support is perforated.

8. A process according to claim 7 characterized in that said support is a layer of organic material.

9. A process according to claim 8 characterized in that said organic material is a polymer attached to said anodic film by means of an adhesive applied to limited areas of said film to minimize blocking of pores in said film.

10. A process according to claim 7 characterized in that said support is a layer of ceramic attached by sintering said ceramic to said anodic film.

11. A process according to claim 1, claim 2, claim 3, claim 4, claim 5 or claim 6 characterized in that said support is imperforate and said support is perforated after said detachment of said film from said substrate.

12. A process according to claim 11 characterized in that said support is perforated by dissolution or degradation.

13. A process according to claim 11 characterized in that said support is perforated by means of a laser.

14. A process according to claim 1, claim 2, claim 3, claim 4, claim 5 or claim 6, characterized in that said support is replaced by a porous supporting structure by positioning said support and porous membrane between porous webs of material and removing said support by dissolving or burning.

15. A process according to claim 1, claim 2, claim 3, claim 4, claim 5 or claim 6, characterized in that a reinforcing material is introduced into pores in limited areas of said outer part of said porous anodic film in order to form an integral porous supporting structure.

16. A process according to claim 1, claim 2, claim 3, claim 4, claim 5 or claim 6, characterized in that said substrate is less flexible than said support and in that said detachment of said film is carried out by peeling said support away from said substrate.

17. A process according to claim 1, claim 2, claim 3, claim 4, claim 5 or claim 6, characterized in that said substrate is more flexible than said support and in that said detachment of said film is carried out by peeling said substrate away from said support.

18. A process according to claim 1, claim 2, claim 3, claim 4, claim 5 or claim 6, characterized in that said substrate is a flexible metal foil and in that said process is carried out continuously by passing an elongated web of said foil through an electrolysis bath, continuously attaching said support to the resulting porous anodic film as the web emerges from the bath and continuously detaching said support and said outer film part from said substrate.

19. A process for producing a separation device by porous anodizing a suitable metal substrate to form a porous anodic film on said substrate, said film having an outer surface, creating a weakened stratum in said porous anodic film, detaching said porous anodic film from said substrate and supporting said porous film on a porous support suitable to form a separation device, characterized in that said support is attached to said outer surface of said anodic film prior to detachment of said anodic film from said substrate, and in that, if said support is insufficiently perforate to form a separation device, a further step of perforating said support or replacing said support with a suitably perforate supporting structure is carried out.

20. A process according to claim 19 characterized in that said weakened stratum is formed in said porous anodic film at a distance from said substrate so that an inner part of said film remains attached to said substrate after detachment of an outer part of said film.

21. A supported porous membrane produced by a process according to claim 1.

22. A separation device characterized in that it is produced by a process according to claim 19 or claim 20.

23. A separation device comprising a porous anodic film supported by a material suitable to form a separation device and reinforced by a non-metallic material, characterized in that said non-metallic material is present in pores in selected areas of said porous anodic film.

* * * * *